United States Patent [19]

Palmer

[11] 4,261,243

[45] Apr. 14, 1981

[54] FASTENERS FOR USE IN APERTURED PANELS

[75] Inventor: John P. Palmer, Reading, England

[73] Assignee: ITW Limited, Windsor, England

[21] Appl. No.: 39,617

[22] Filed: May 29, 1979

[51] Int. Cl.³ .............................................. F16B 19/00
[52] U.S. Cl. ..................................... 411/510; 24/73 P
[58] Field of Search ................... 85/5 R, DIG. 2, 80, 85/8.3; 24/73 P, 73 PF, 73 PM, 73 HS, 214, 208 A

[56] References Cited

U.S. PATENT DOCUMENTS

| | | | |
|---|---|---|---|
| 3,244,057 | 4/1966 | Mathison | 85/5 R |
| 3,466,966 | 9/1969 | Brown | 85/5 R |
| 3,483,787 | 12/1969 | Saunders | 85/5 R |
| 3,494,244 | 2/1970 | Wayland | 85/5 R |
| 3,745,612 | 7/1973 | Seckerson | 85/5 R X |
| 3,810,279 | 5/1974 | Swick et al. | 85/5 R X |

FOREIGN PATENT DOCUMENTS 1317354  1/1963  France ........................................ 85/5 R 937220  9/1963  United Kingdom ..................... 24/73 P Primary Examiner—Ramon S. Britts
Attorney, Agent, or Firm—Thomas W. Buckman; Jack R. Halvorsen

[57] ABSTRACT

A fastener is described in which a substantially rigid pillar formed at one of its ends with a radially enlarged head is provided with a number of radially projecting and longitudinally extending substantially rigid webs, the fastener being further formed with a number of thin plates arranged between adjacent webs in a plane or planes transverse or oblique to the axis of the pillar, the or each plate being attached at one of its edges to one of the webs, and the radial extent of the webs being less than the maximum radial extent of the plate or plates. The plates can be arranged in planes to which the axis of the pillar is perpendicular, or the plates may be inclined in either the circumferential or the radial direction with respect to the pilar. The head of the fastener may be a simple dished skirt, or may be provided with a formation adapted to retain a second component.

20 Claims, 7 Drawing Figures

FASTENERS FOR USE IN APERTURED PANELS

The invention relates to fasteners for use in apertured panels, and is particularly usefully incorporated in fasteners for securing trim panels in automobiles. Trim panels are usually of fibreboard construction, and are removably secured to the vehicle interior to provide a decorative effect.

The fastener of the present invention includes a substantially rigid pillar having at one end a radially enlarged head, the pillar having a number of radially projecting and longitudinally extending substantially rigid webs, and the fastener being further formed with a number of thin plates arranged between adjacent webs in a plane or planes transverse or oblique to the axis of the pillar, the or each plate being attached at one of its edges to one of the webs, the radial extent of the webs being less than the maximum radial extent of the plate or plates.

In the preferred embodiment, the pillar has four longitudinal webs tapering towards the free end of the pillar, equally spaced angularly round the pillar, in an X-shaped or cruciform cross-section. However, other shape of cross-section are envisaged such as L, Y, H, I or Z.

In an alternative embodiment, the pillar may have only two diametrically opposed webs, and triangular semicircular or semi-elliptical plates may be arranged to extend on one or both sides of the plane of webs, the plates being arranged in planes perpendicular or oblique to the axis of the pillar.

The webs may extend the entire length of the pillar, or may be confined only to a part thereof.

If the fastener is formed with transversely oriented plates between each adjacent pair of webs, then if only one plate is present between each pair of webs, the plates are usually arranged in one plane perpendicular to the axis of the pillar, but they can be staggered, and if two or more plates are present they may be arranged in two or more parallel planes in coplanar or staggered relationship.

If the fastener is formed with obliquely oriented plates between the webs, the plates may be inclined either on the radial or the circumferential direction with respect to the pillars. As is the case with fasteners in which the plates are transversely arranged, the obliquely arranged plates may be provided singly or plurally between adjacent webs.

If a single obliquely arranged plate is provided between each adjacent pair of webs, the plates may be equidistant from an end of the pillar, or they may be staggered or arranged spirally.

When a plurality of inclined plates are provided between each adjacent two webs, the plates may be arranged to extend at a number of discrete locations in arrays resembling the blades of a propellor, or in spiral or staggered configurations.

On the side of the head remote from the pillar, the fastener may be formed with a formation to engage or retain a second component to a panel. The fastener is particularly described in conjunction with a trim panel engaging shank extending from the head and surmounted by a radially enlarged retaining disc, but it is understood that this formation may be omitted or replaced by any other convenient fix detail, clip, stud, strap or other feature.

The fastener shown has a head constituted by a dished skirt, a trim panel retaining formation extending from the convex side of the skirt, the formation comprising an enlarged disc supported by a shank extending from the skirt. The shank is preferably made barrel-shaped, to have a convex outline when viewed from the side. This ensures that an equal degree of retention is achieved on the trim panel regardless of the trim panel thickness, as substantially only a line contact exists between the shank and the trim panel.

An attribute of the present fastener is that it may be removed and inserted several times without significant damage either to itself or to a paint surface on the panel in which it is used.

To enhance operator safety, and to prevent possible damage to soft trim materials retained by the fastener, the tapered extremity of the pillar may be provided with an enlarged rounded nosepiece.

Three embodiments of the invention will now be described in detail with reference to the accompanying drawings, in which.

Figure 1:
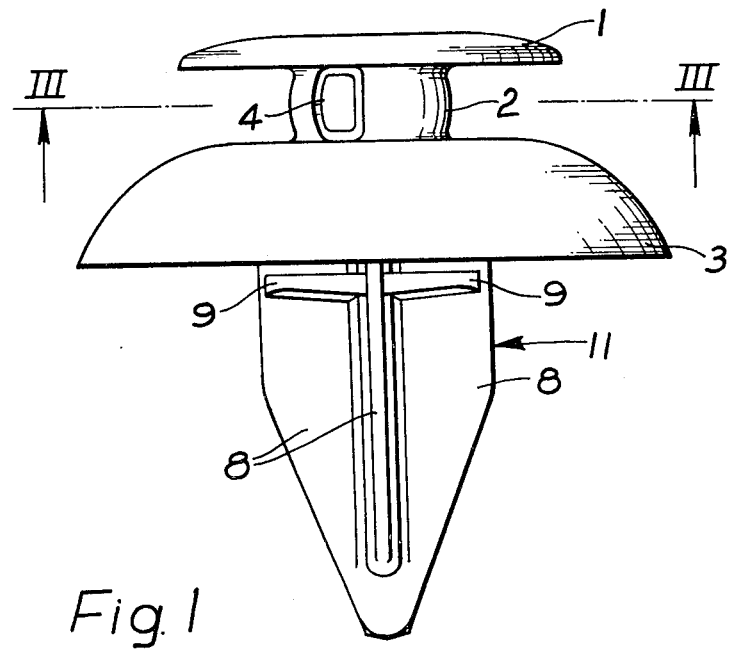
FIG. 1 is a side elevation of a first fastener according to the present invention.
Figure 2:
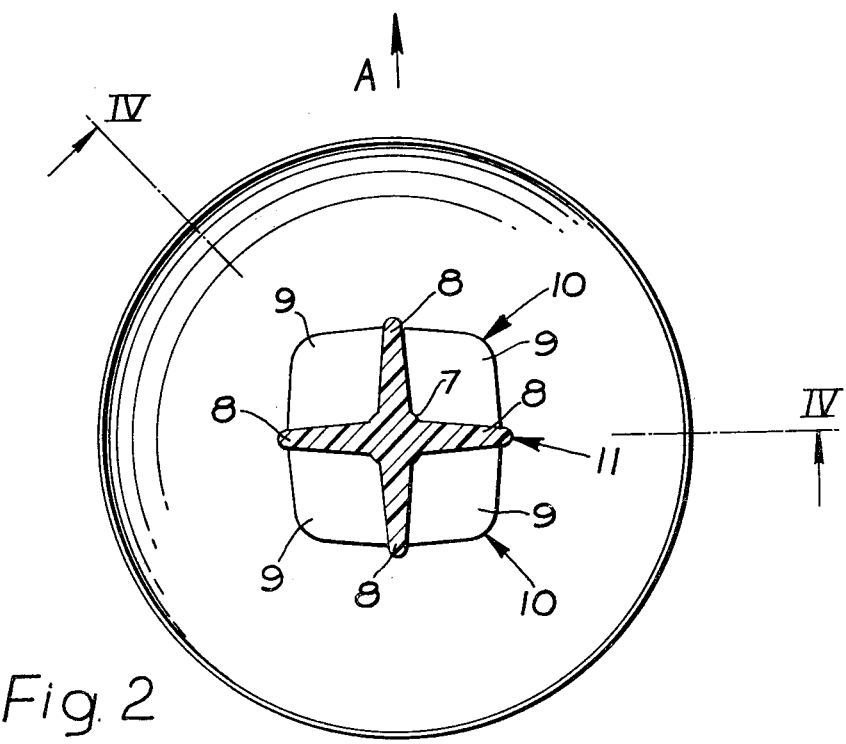
FIG. 2 is an end view of the fastener of FIG. 1, seen in the direction of arrow A in the Figure.
Figure 3:
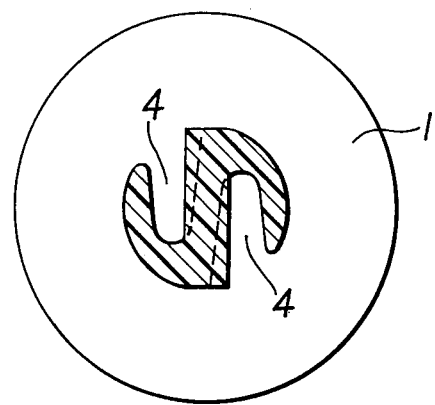
FIG. 3 is a cross-section taken in the plane III—III of FIG. 1.

Referring now to the Figures, there is seen in FIGS. 1 to 4 a fastener having a disc 1, a shank 2 and a head which is constituted in the present embodiment by a dished skirt 3. The disc 1 is coaxial with the shank 2. The shank is substantially circular in cross-sectional outline but has two indentations 4 which make the shank resiliently deformable in the radial direction. The shank 2 is also shaped to have a greater diameter at its midheight than at its ends, the effect being to give the shank a convex outer surface which is substantially part-spherical. The skirt 3 is a thin circular dished portion, tapering in thickness towards its periphery. The upper and lower surfaces 5 and 6 of the skirt are formed as smooth curves, most easily seen in FIG. 4, and this enables a large depth D to be obtained while still allowing the fastener to be produced in a two-plate mould. The extreme thinness of the periphery of the skirt ensures that sealing engagement to a panel is achieved even when the panel surface is made irregular by the presence of paint drops, burrs, excess solder or other imperfections.

Figure 4:
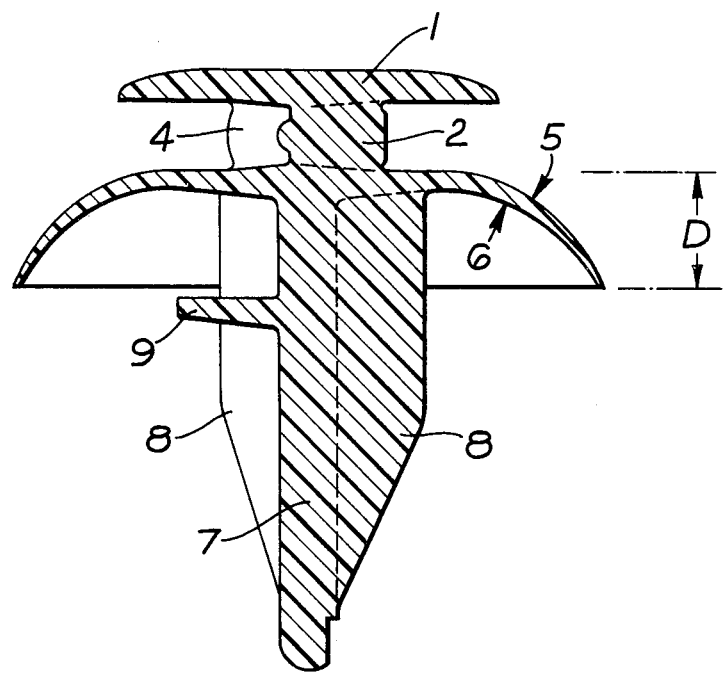
FIG. 4 is a section taken on line IV—IV of FIG. 2.

The lower part of the fastener, as seen in FIGS. 1 and 4 comprises a central pillar 7, which has four equally angularly spaced radially extending substantially rigid longitudinal webs 8 projecting therefrom. The webs 8 are tapered towards the free end of the pillar. Alternatively, the webs may have substantially the same radial extent throughout their length.

Figure 5:
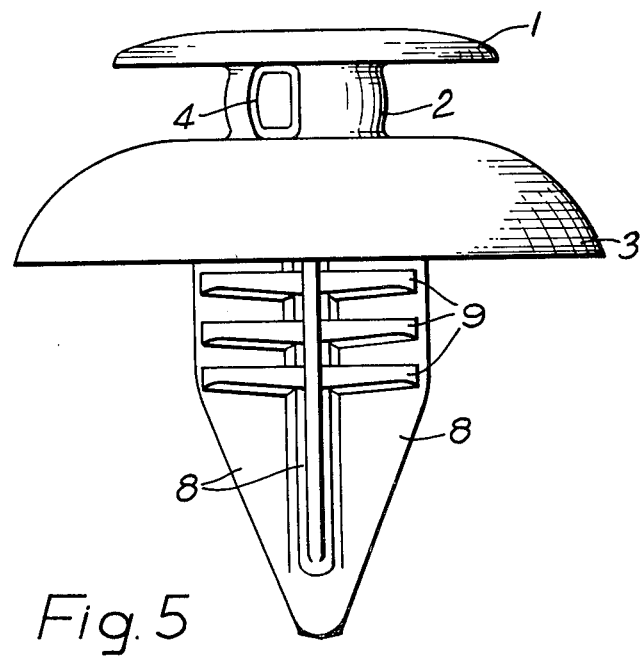
FIG. 5 is a side elevation of a second fastener.

Extending in transverse planes relative to the pillar 7, and situated between adjacent pairs of webs 8, are resilient plates 9. In the embodiment shown in FIGS. 1 to 4 one plate 9 is provided between each adjacent pair of webs 8, but any convenient number may be provided. If only one plate is provided between each pair of webs, the plates may be spaced from the underside 6 of the skirt 3 by equal or differing distances, for example two non-adjacent resilient plates may be a first distance from the skirt while two other plates may be a second distance therefrom. The embodiment shown in FIG. 5 illustrates three plates 9 between each adjacent pair of webs 8, the plates being arranged in three parallel planes. However, the plates could be staggered or arranged in a spiral array, as is convenient.

The plates are so dimensioned that the maximum radial distance from the axis of the pillar 7 to the extremity 10 of each plate 9 is greater than the distance from the axis of the pillar to the edge 11 of each web 8.

In operation, the fastener is received in a circular aperture in a panel, the radius of the aperture being slightly greater than the distance from the axis to the edge of the webs 8, but less than the distance from the axis to the extremities 10. By such an arrangement, the webs may pass freely through the aperture. When the fastener has been inserted sufficiently for the undersurfaces of plates 9 to contact the panel, further pressure on the disc 1 of the fastener causes the plates 9 to flex in the region of the extremities 10, and in flexing the radial distance between the extremities 10 and the axis is reduced. The flexed plates may then pass through the panel aperture and as the extremities of the plates emerge from the panel aperture they resume their former, planar, configuration.

If the panels with which the fasteners are to be used are of only one thickness, then only one plate is needed between each adjacent pair of webs on the fastener. The spacing between the plates and the underside of the fastener skirt is so arranged that the skirt engages one surface of the panel in sealing engagement while the extremities of the plates engage the other surface of the panel. Thus, the spacing must be less than the panel thickness.

If more than one panel thickness is to be accommodated, then plates spaced at different distances from the skirt must be provided. When for example, the fastener shown in FIG. 5, is used with a panel of small thickness, then all the plates pass through the aperture and emerge on the side of the panel remote from the head, as seen on the left-hand part of FIG. 6. The extremities of the plates nearest the skirt engage the panel to retain the fastener.

Figure 6:
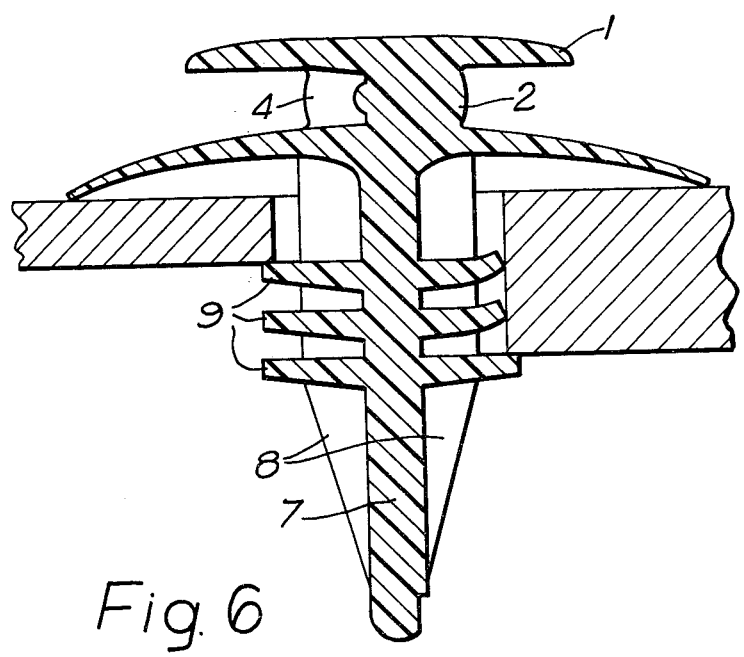
FIG. 6 is a sectional view of the fastener of FIG. 5, showing the fastener mounted in panels of two different thicknesses.
Figure 7:
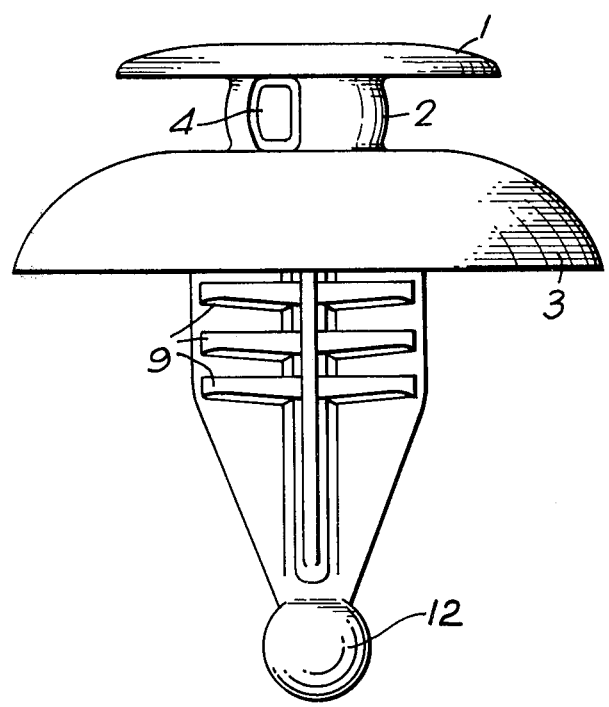
FIG. 7 shows a third fastener, incorporating a spherical nosepiece at the end of the pillar remote from the skirt.

When, on the other hand, the fastener is used in a thicker panel, as illustrated on the right-hand side of FIG. 6, not all the plates will emerge from the aperture. In the situation shown on the right of FIGS. 6, only the extremities of the plates furthest from the skirt engage the panel at its side remote from the skirt; the other plates are in their deformed positions engaging the wall of the aperture.

As is clear from FIG. 6, the fastener can be used in a panel of any thickness between the limits shown.

The taper shown in FIGS. 1, 4, 5 and 6 on the plates ensures that the flexibility of the extremities of the plates is such that they deform rather than break off.

As a further alternative, plates of uniform cross-section may be used in any of the fasteners herein described.

Any of the fasteners may be provided with a spherical nosepiece 12 to enhance operator safety.

Various configurations of webs 8 and plates 9 are foreseen, for example three webs set at 120° with diamond or kite-shaped plates, webs set out in H formation, or in Z or L formation.

It may be advantageous for applications where fasteners are used in large apertures to have a hollow polygonal central pillar with webs extending radially from the corners, plates being arranged between the webs to provide engagement with the remote side of the panel.

I claim:

1. A one-piece reusable plastic fastener adapted for use with an apertured support means, said aperture having a predetermined diametral extent, said fastener including a substantially rigid pillar having at one end a radially enlarged head, the pillar having a plurality of radially projecting and longitudinally extending substantially rigid webs, and at least one thin plate arranged between adjacent webs with each said at least one plate being attached at its substantially contiguous edges to two adjacent webs, said edges extending laterally outwardly no further than said webs, the radial extent of the webs being less than the maximum radial extent of said at least one plate which, in turn, is greater diametrally than said predetermined diametral extent, said webs serving to center said fastener in said aperture while said at least one plate is adapted to flex while traversing said support means and to underlie said means after substantially returning to their initial state.

2. A fastener according to claim 1 in which a plurality of plates are arranged between each adjacent two webs.

3. A fastener according to claim 2 in which an equal number of plates are positioned between each adjacent two webs.

4. A fastener according to claim 3 in which the plates are arranged in transverse planes and the number of transverse planes in which plates lie is equal to the number of plates between each adjacent two webs.

5. A fastener according to claim 2 in which the plates lie in transverse planes and the number of plates lying in any of the transverse planes is less than the number of webs.

6. A fastener according to claim 1 in which the plates are arranged obliquely to the axis of the pillar, the plates being inclined in the circumferential direction.

7. A fastener according to claim 1 in which the plates are arranged obliquely to the axis of the pillar, the plates being inclined in the radial direction.

8. A fastener according to claim 1 in which the pillar has four equally angularly spaced webs.

9. A fastener according to claim 1 in which the webs are tapered at the end of the pillar remote from the head.

10. A fastener according to claim 1 in which the end of the pillar remote from the head is rounded.

11. A fastener according to claim 10, in which the end of the pillar remote from the head is formed with an enlarged rounded nosepiece.

12. A fastener according to claim 1 in which the webs extend along the entire length of the pillar.

13. A fastener according to claim 1 in which the radially enlarged head is a dished skirt.

14. A fastener according to claim 13 in which the pillar extends from the concave side of the skirt.

15. A fastener according to claim 1 which includes, on the side of the head remote from the pillar, a formation to engage or retain a second component.

16. A fastener according to claim 15, in which the formation comprises a shank extending from the head and carrying at its end remote from the head a radially enlarged disc.

17. A fastener according to claim 16, in which the shank has a greater diameter at its mid point than at its ends.

18. A fastener according to claim 17, in which the shank is resiliently deformable, in a radial direction.

19. A fastener according to claim 18 in which the pillar is hollow.

20. A fastener according to claim 1 in which the pillar is polygonal in cross-sectional shape, the webs radiating from its corners.

* * * * *

UNITED STATES PATENT AND TRADEMARK OFFICE
CERTIFICATE OF CORRECTION

PATENT NO. : 4,261,243
DATED : April 14, 1981
INVENTOR(S) : John P. Palmer

It is certified that error appears in the above-identified patent and that said Letters Patent are hereby corrected as shown below:

[30] Foreign Application Priority Data
May 16, 1978 United Kingdom ........... 19682/78

In the Abstract, line 14, correct spelling of "pilar" to read pillar.

Signed and Sealed this

*Twenty-third* Day of *June 1981*

[SEAL]

*Attest:*

RENE D. TEGTMEYER

*Attesting Officer*   *Acting Commissioner of Patents and Trademarks*